United States Patent
Hedlund

(10) Patent No.: US 10,785,952 B2
(45) Date of Patent: Sep. 29, 2020

(54) SHORT MILK TUBE WITH PROTECTIVE VENT FOR A DAIRY ANIMAL MILKER UNIT

(71) Applicant: GEA Farm Technologies, Inc., Naperville, IL (US)

(72) Inventor: Nathan Hedlund, Galesville, WI (US)

(73) Assignee: GEA Farm Technologies, Inc., Naperville, IL (US)

( * ) Notice: Subject to any disclaimer, the term of this patent is extended or adjusted under 35 U.S.C. 154(b) by 641 days.

(21) Appl. No.: 14/934,754

(22) Filed: Nov. 6, 2015

(65) Prior Publication Data

US 2016/0128299 A1    May 12, 2016

Related U.S. Application Data

(60) Provisional application No. 62/077,158, filed on Nov. 7, 2014.

(51) Int. Cl.
 *A01J 5/16* (2006.01)
 *A01J 5/08* (2006.01)
 *A01J 5/04* (2006.01)

(52) U.S. Cl.
 CPC ................. *A01J 5/16* (2013.01); *A01J 5/044* (2013.01); *A01J 5/048* (2013.01); *A01J 5/08* (2013.01)

(58) Field of Classification Search
 CPC .... A01J 5/16; A01J 5/044; A01J 5/048; A01J 5/08
 See application file for complete search history.

(56) References Cited

U.S. PATENT DOCUMENTS

| | | |
|---|---|---|
| 1,301,992 A | 1/1919 | Anderson |
| 2,099,884 A | 2/1936 | Green |
| 2,321,236 A | 6/1943 | Parkin |
| 2,341,953 A | 2/1944 | Scott |
| 2,513,627 A | 7/1950 | Dinesen |
| 2,664,809 A | 1/1954 | Morell |
| 3,014,455 A | 12/1961 | Olander |
| 3,074,837 A † | 1/1963 | Flax |
| 3,079,891 A | 3/1963 | Miller |
| 3,476,085 A | 11/1969 | Noorlander |

(Continued)

FOREIGN PATENT DOCUMENTS

| | | |
|---|---|---|
| CA | 2500708 | 4/2004 |
| EP | 1549134 | 6/2013 |

(Continued)

OTHER PUBLICATIONS

American Society of Agricultural Engineers. Terminology for Milking Machines, Milk Cooling, and Bulk Milk Handling Equipment. Jul. 3, 1996.

(Continued)

*Primary Examiner* — Joshua D Huson
(74) *Attorney, Agent, or Firm* — Smith Law Office; Jeffry W. Smith

(57) ABSTRACT

A short milk tube for extending between a milker teat cup and liner assembly and a milker unit and the short milk tube includes a vent seat having an outwardly extending protective vent plug lip, and a stiffener at least partially surrounding the vent seat to control bending of the short milk tube.

8 Claims, 13 Drawing Sheets

(56) References Cited

U.S. PATENT DOCUMENTS

| | | | |
|---|---|---|---|
| 3,659,558 A * | 5/1972 | Noorlander | A01J 5/08 119/14.36 |
| 3,713,423 A | 1/1973 | Sparr | |
| 3,999,516 A | 12/1976 | Shulick | |
| 4,043,739 A | 8/1977 | Appel | |
| 4,090,471 A | 5/1978 | Thompson | |
| 4,196,696 A | 4/1980 | Olander | |
| 4,303,038 A | 12/1981 | Thompson et al. | |
| 4,324,201 A | 4/1982 | Larson | |
| 4,441,454 A | 4/1984 | Happel et al. | |
| 4,459,938 A | 7/1984 | Noorlander | |
| 4,481,906 A * | 11/1984 | Steingraber | A01J 7/005 119/14.32 |
| 4,593,649 A | 6/1986 | Britten | |
| 4,604,969 A † | 8/1986 | Larson | |
| 4,745,881 A | 5/1988 | Larson | |
| 4,869,205 A | 9/1989 | Larson | |
| 4,907,535 A | 3/1990 | Matsuzawa et al. | |
| 5,007,378 A | 4/1991 | Larson | |
| 5,069,162 A | 12/1991 | Thompson et al. | |
| 5,482,004 A | 1/1996 | Chowdhury | |
| 5,493,995 A | 2/1996 | Chowdhury | |
| 5,572,947 A | 11/1996 | Larson et al. | |
| 6,009,834 A | 1/2000 | Krone et al. | |
| 6,039,001 A | 3/2000 | Sanford | |
| 6,055,931 A * | 5/2000 | Sanford, Jr. | A01J 5/044 119/14.36 |
| 6,142,098 A | 11/2000 | Van Den Berg | |
| 6,276,297 B1 | 8/2001 | Van Den Berg et al. | |
| 6,302,058 B1 | 10/2001 | Dahl et al. | |
| 6,439,157 B1 † | 8/2002 | Petterson | |
| 6,598,560 B1 | 7/2003 | Van Den Berg | |
| 6,755,153 B1 | 6/2004 | Chowdhury | |
| 6,796,272 B1 * | 9/2004 | Chowdhury | A01J 5/08 119/14.46 |
| 6,895,892 B2 | 5/2005 | Sellner et al. | |
| 6,899,055 B2 | 5/2005 | Alveby et al. | |
| 7,290,497 B2 | 11/2007 | Rottier et al. | |
| 7,293,527 B2 * | 11/2007 | Shin | A01J 5/08 119/14.47 |
| 7,540,258 B2 * | 6/2009 | Boast | A01J 5/08 119/14.02 |
| 8,033,247 B2 | 10/2011 | Torgerson et al. | |
| 8,176,872 B2 † | 5/2012 | Crespo | |
| 8,356,576 B2 * | 1/2013 | Laney | A01J 5/08 119/14.47 |
| 8,485,129 B2 | 7/2013 | Wulle et al. | |
| 8,627,785 B2 | 1/2014 | Grace et al. | |
| 8,677,937 B2 † | 3/2014 | Shin | |
| 9,016,238 B2 * | 4/2015 | Duke | A01J 5/08 119/14.51 |
| 9,138,938 B1 † | 9/2015 | Joshi | |
| 9,204,616 B2 * | 12/2015 | Chowdhury | A01J 7/00 |
| 9,339,004 B2 | 5/2016 | La Torre et al. | |
| 9,526,225 B2 | 12/2016 | Kochman et al. | |
| 9,635,829 B2 | 5/2017 | La Torre et al. | |
| D830,649 S * | 10/2018 | Hedlund | D30/199 |
| 2004/0089242 A1 | 5/2004 | Verstege et al. | |
| 2004/0094096 A1 | 5/2004 | Fransen et al. | |
| 2005/0284378 A1 | 12/2005 | Shin | |
| 2005/0284379 A1 | 12/2005 | Shin | |
| 2006/0005772 A1 * | 1/2006 | Shin | A01J 5/08 119/14.52 |
| 2006/0016399 A1 | 1/2006 | Torgerson | |
| 2007/0137582 A1 | 6/2007 | Boast | |
| 2007/0245965 A1 | 10/2007 | Petterson et al. | |
| 2007/0245966 A1 | 10/2007 | Pettersson et al. | |
| 2008/0035064 A1 | 2/2008 | Petterson et al. | |
| 2008/0252053 A1 | 10/2008 | Schneider et al. | |
| 2008/0276871 A1 | 11/2008 | Auburger et al. | |
| 2009/0050061 A1 | 2/2009 | Duke | |
| 2009/0050062 A1 | 2/2009 | Auburger et al. | |
| 2009/0320760 A1 | 12/2009 | Torgerson et al. | |
| 2010/0083903 A1 | 4/2010 | Hiley et al. | |
| 2010/0275849 A1 † | 11/2010 | Wulle | |
| 2011/0132265 A1 | 6/2011 | Laney | |
| 2014/0123903 A1 | 5/2014 | Priest | |
| 2014/0190416 A1 | 7/2014 | Kochman et al. | |

FOREIGN PATENT DOCUMENTS

| | | |
|---|---|---|
| WO | 99/66787 | 12/1999 |
| WO | 00/69252 | 11/2000 |
| WO | 02/07506 | 1/2002 |
| WO | 2004/030445 | 4/2004 |
| WO | 2008/031818 | 3/2008 |

OTHER PUBLICATIONS

International Search Report dated Feb. 4, 2004, PCT/US03/031002, 4 pages.

Jeffry W. Smith's letter sent to Vincent LoTempio of Kloss Stenger & LoTempio sent on Nov. 20, 2015, 14 pages.

May 16, 2016 "Summary of Preliminary Patentability Search and Opinion" of Kloss, Stenger & LoTempio for Skellerup, 4 pages.

Jeffry W. Smith's Jul. 7, 2016 response letter to Vincent LoTempio's Jun. 8, 2016 "Summary of the Proposed Claim Amendments," 1 page.

Vincent LoTempio's Jun. 8, 2016 "Summary of the Proposed Claim Amendments," 2 pages.

Vincent LoTempio's Nov. 9, 2016 "Evidence of Skellerup Joint Inventorship and Background," 34 pages.

Jeffry W. Smith's Nov. 30, 2016 response letter to Vincent LoTempio's Nov. 9, 2016 Letter, 1 page.

David T. Stephenson's Dec. 27, 2016 "Dispute Resolution Proposal," 2 pages.

Jeffry W. Smith's Mar. 2, 2017 response letter to David T. Stephenson's Dec. 27, 2016 letter, 1 page.

David T. Stephenson's Apr. 6, 2017 second "Dispute Resolution Proposal," 2 pages.

International Search Report and Written Opinion dated Jan. 20, 2016; PCT Application No. PCT/US2015/059483, 12 pages.

International Preliminary Report on Patentability for PCT/US2015/059483 dated May 9, 2017, 6 pages.

* cited by examiner
† cited by third party

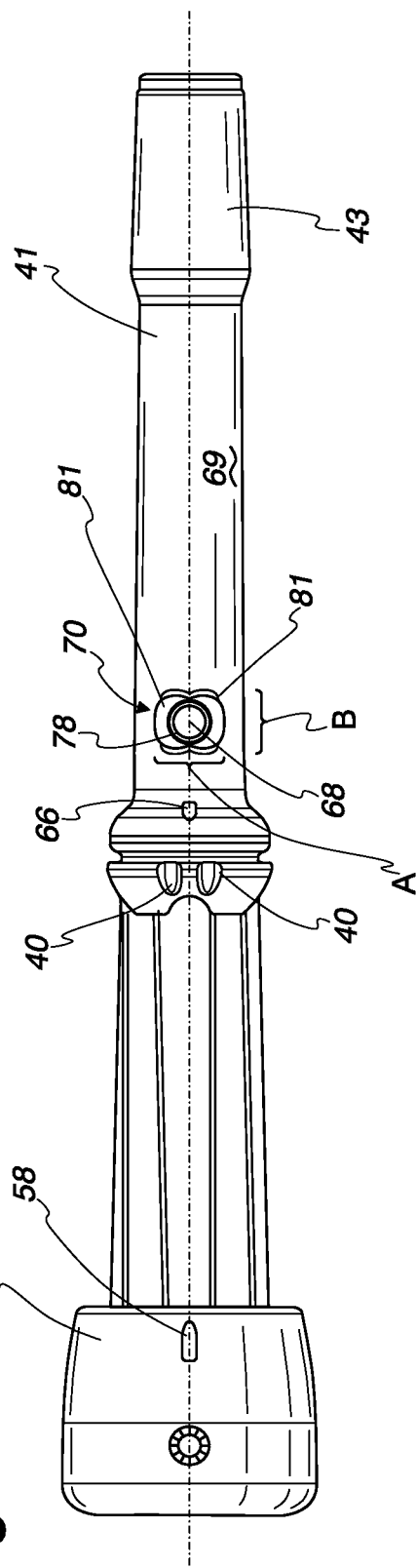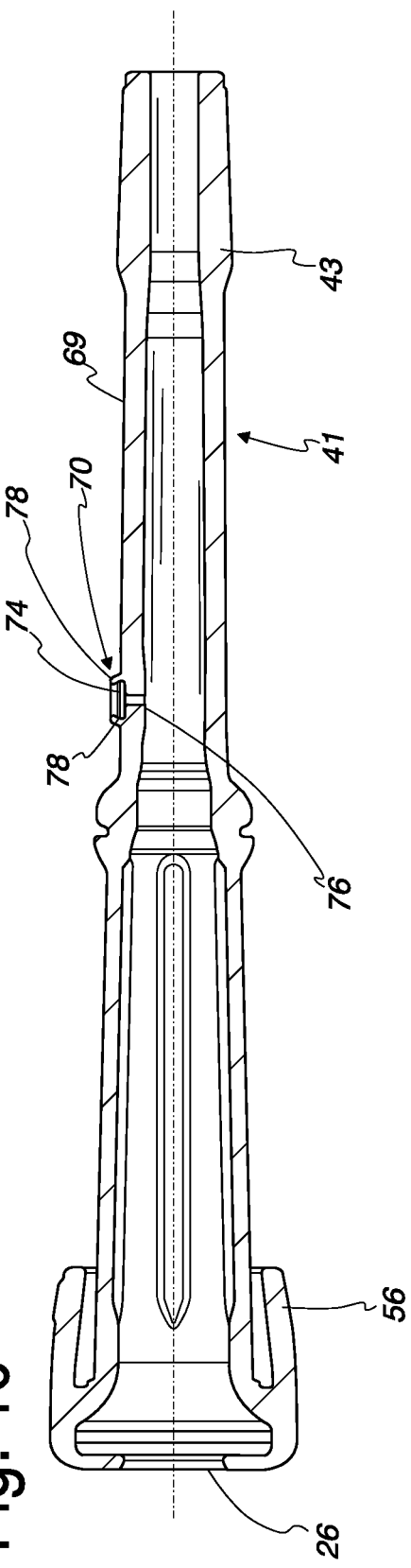

SHORT MILK TUBE WITH PROTECTIVE VENT FOR A DAIRY ANIMAL MILKER UNIT

CROSS REFERENCE TO RELATED APPLICATION

This application claims the benefit of U.S. Provisional Application 62/077,158, filed Nov. 7, 2014, the disclosure of which is incorporated by reference herein.

FIELD AND BACKGROUND OF THE INVENTION

This invention relates generally to milker units for milking dairy animals, and more particularly to a short milk tube extending between a milker unit shell and liner combination and a milker unit that has an improved vent to protect a vent plug and provide a more secure seat for the vent plug.

Milker units for milking dairy animals include a shell and liner in a teat cup assembly that attaches to a dairy animal teat. The liner fits inside the shell and a vacuum chamber is defined between the shell and the liner. A pulsating vacuum is applied to the vacuum chamber to move the liner in and out of compression (massaging) contact with a dairy animal teat that is in the liner. The pulsating vacuum in the pulsation chamber is opposed by a constant vacuum inside of the liner. The pulsating vacuum is applied through a pulsation connection in the side of the shell and the constant vacuum is applied through a milk hose connected to the liner. The milk hose vacuum also draws milk from the liner into a short milk tube, milking claw, and collection bowl, through a long milk tube, and into a milk collection system.

The shell and liner are fitted together in a coaxial relationship and a mouthpiece of the liner fits over the top of the shell so that the mouthpiece, and not the shell, contacts the animal. The mouthpiece provides a vacuum seal against the teat of the animal being milked. The liner also includes a barrel joined to the mouthpiece and into which the animal's teat extends during milking. The teat is massaged by the liner barrel by the pulsating vacuum. Various barrel designs have been developed to improve cow comfort and milking efficiency.

A lower end of the liner barrel extends out of a hole in the lower end of the shell. The liner barrel typically includes a locking ring that is pulled through the shell hole during assembly, so that the locking ring is outside of the shell when the liner is installed.

The liner is adequately secured in the shell because the upper mouthpiece of the liner is engaged with an upper end of the shell, and the locking ring of the liner is engaged with a lower end of the shell. In a typical shell and liner assembly, the liner will even be somewhat tensioned in an axial direction because of the opposing engagements at the top and bottom of the shell.

Extending downstream from the liner is a short milk tube that can be joined to or formed with the liner. For a variety of reasons, the short milk tube can be twisted and that twisting can cause the liner barrel to twist as well. The twisting of the short milk tube can be intentional to close the vacuum line when a dairy operator decides to leave a teat cup assembly off a dairy animal because there is no teat or the teat is injured or otherwise too unhealthy to be milked. Other forces can twist the short milk tube, so it is not uncommon for liner barrel to be twisted as well. When the liner barrel twists, it is possible that the seal with the dairy animal can fail or it can otherwise inhibit efficient milking and milking operations.

Short milk tubes have included vent holes to balance or limit the amount of vacuum applied to the teat cup liner and animal teat, and to improve milk flow through the short milk tube. Typically, the short milk tube vent hole is drilled and a relatively rigid or robust vent plug is inserted in the vent hole, so that the drilled vent hole remains open. The vent plug includes a vent passage that is relatively rigid and formed in a predetermined size to ensure adequate and predictable venting. Nonetheless, in the dairy environment, the plugs are exposed to twisting and impact forces that can damage or remove the plug, or tear the drilled liner hole. Obviously, such damage limits the useful life of the short milk tube, which increase capital and maintenance costs.

Thus, there is needed a relatively inexpensive short milk tube arrangement that provides adequate venting and protection of vents and vent plugs.

SUMMARY OF THE INVENTION

The present invention is directed to a short milk tube that includes a vent and a vent seat at least partially surrounding the vent. The vent seat can be sized and shaped to mate with a vent plug. The vent seat can include a lip that extends outwardly from the short milk tube wall and at least partially surround the vent and vent plug to protect them from dirt and debris, as well as impact forces and twisting of the short milk tube. The vent seat can also include inner and/or outer vent seats that are sized, shaped and arranged to better mate with the vent plug. The vent seat can be formed integrally with the short milk tube or it can be attached in any suitable manner. The material used for the short milk tube can also be used for the vent seat, or the vent seat can be made of a different material.

The short milk tube may or may not be formed integrally with a teat cup liner, and it may or may not be used in conjunction with the anti-twist liner and teat cup assembly that is also disclosed in this specification.

BRIEF DESCRIPTION OF THE DRAWINGS

FIG. 9 is a side view of the liner with short milk tube vent plug seat of FIG. 8;

FIG. 10 is a cross-sectional view of the liner with a short milk tube with a vent plug seat of FIG. 8;

DETAILED DESCRIPTION OF THE DRAWINGS

Figure 1:
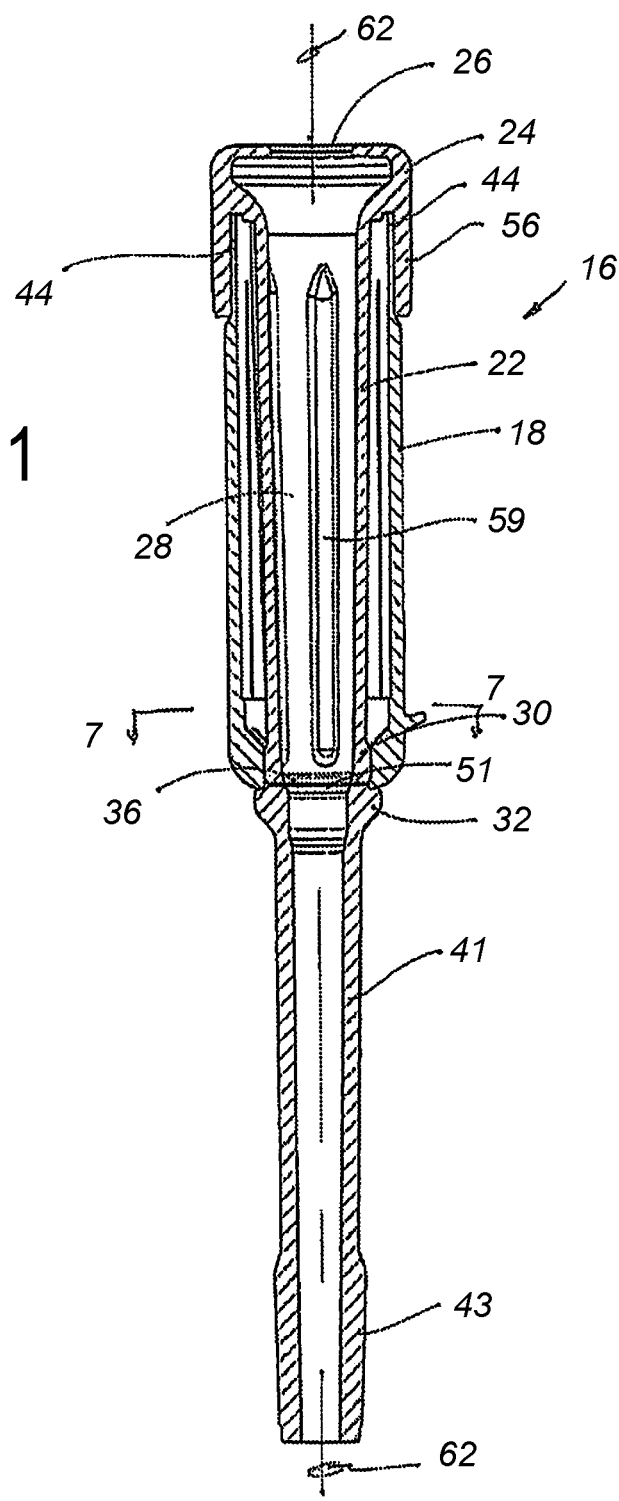
FIG. 1 is a side cross-sectional view of a teat cup assembly in accordance with the present invention.

In the following detailed description of the drawings the same reference numeral will be used to identify the same or similar elements in each of the figures. Depicted in FIG. 1 is a cross-sectional view of a teat cup assembly 16, in accordance with the present invention, including a shell 18 and a shell liner 22. The shell liner 22 includes a mouthpiece 24 defining a teat opening 26, a barrel 28 joined to the mouthpiece 24 and extending downwardly as depicted, an upper locking ring 30, and a lower locking ring 32 spaced apart from the upper locking ring to define a shell-engaging annular recess 36. The upper locking ring 30 defines a number of alignment recesses 40.

The liner 22 can also include an integral short milk tube 41 joined to the barrel 28 and having a teat claw connecting end 43. The short milk tube 41 is an optional extension of the liner 22, and in other embodiments, the short milk tube 41 can be a separate item that connects to a lower end of the liner 22.

Figure 3:
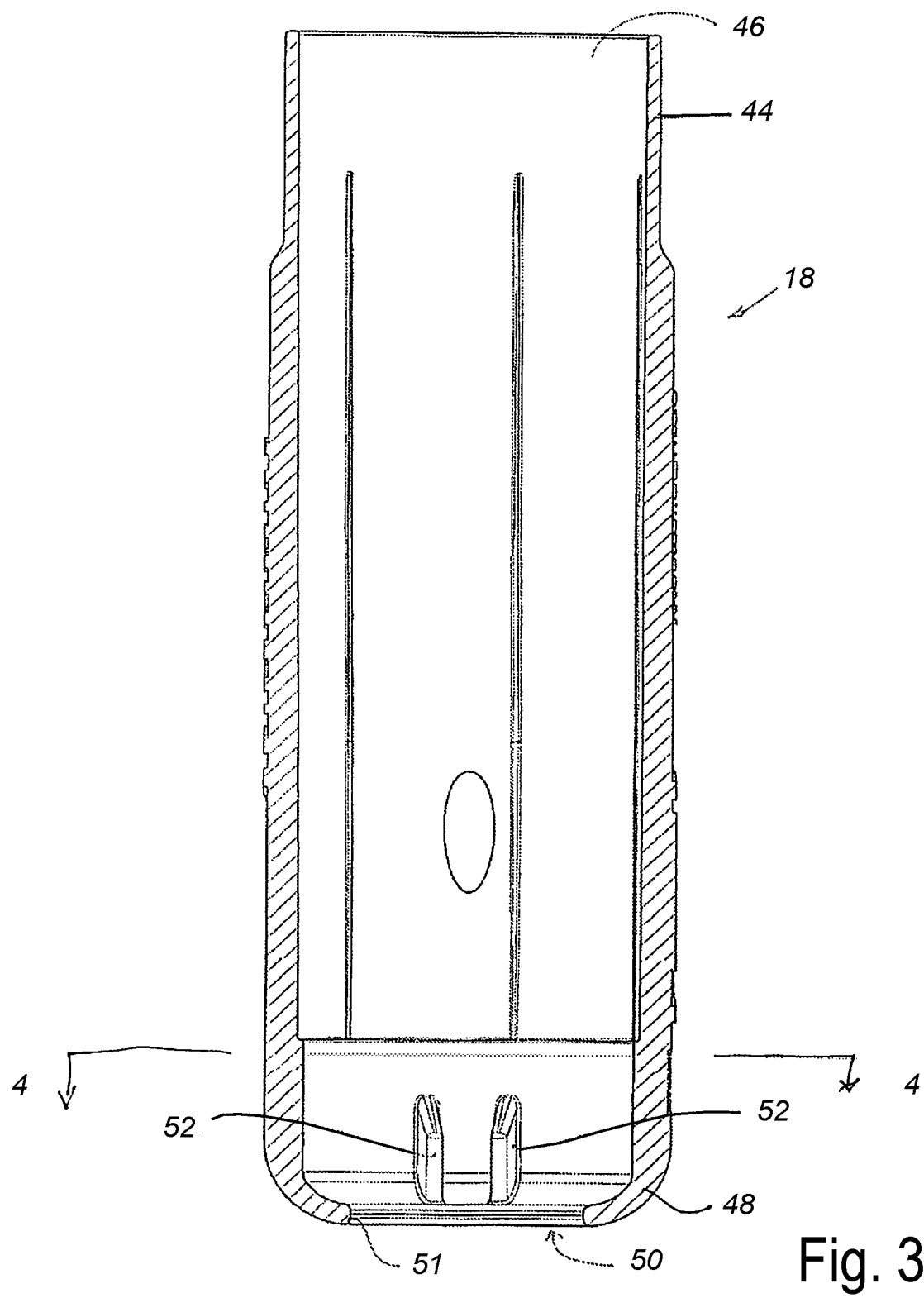
FIG. 3 is a cross-sectional perspective view of a teat cup assembly shell in accordance with the present invention.
Figure 4:
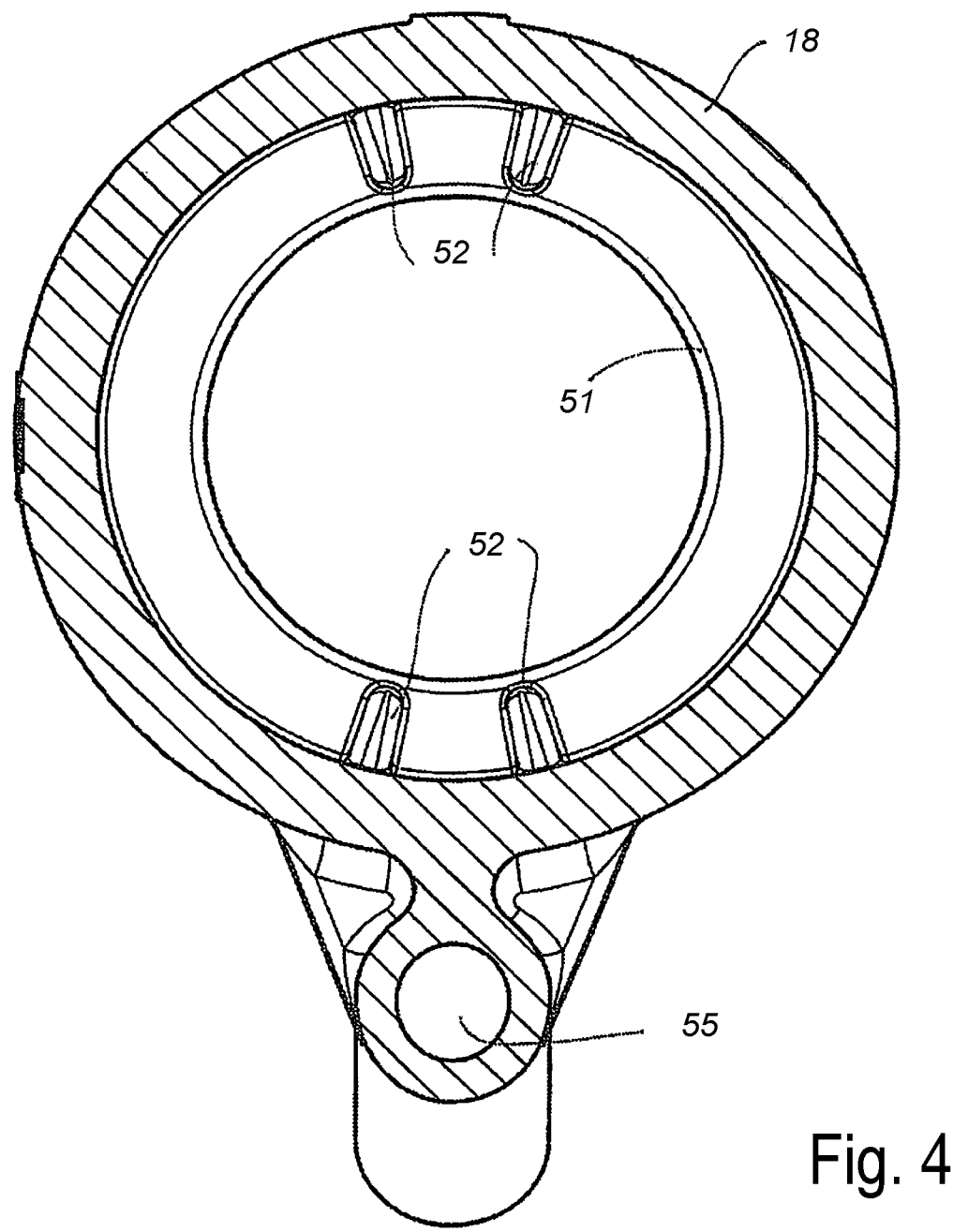
FIG. 4 is a cross-sectional view of the shell taken along line 4-4 of FIG. 3.

As illustrated in FIGS. 1, 3, and 4 the shell 18 includes an upper end 44, an upper opening 46, a lower end 48 defining a lower opening 50 with an inwardly directed annular edge 51, and keys 52 that are provided in a number, size, and arrangement to mate with the alignment recesses 40. The shell 18 also includes a pulsation connector 55.

Figure 2:
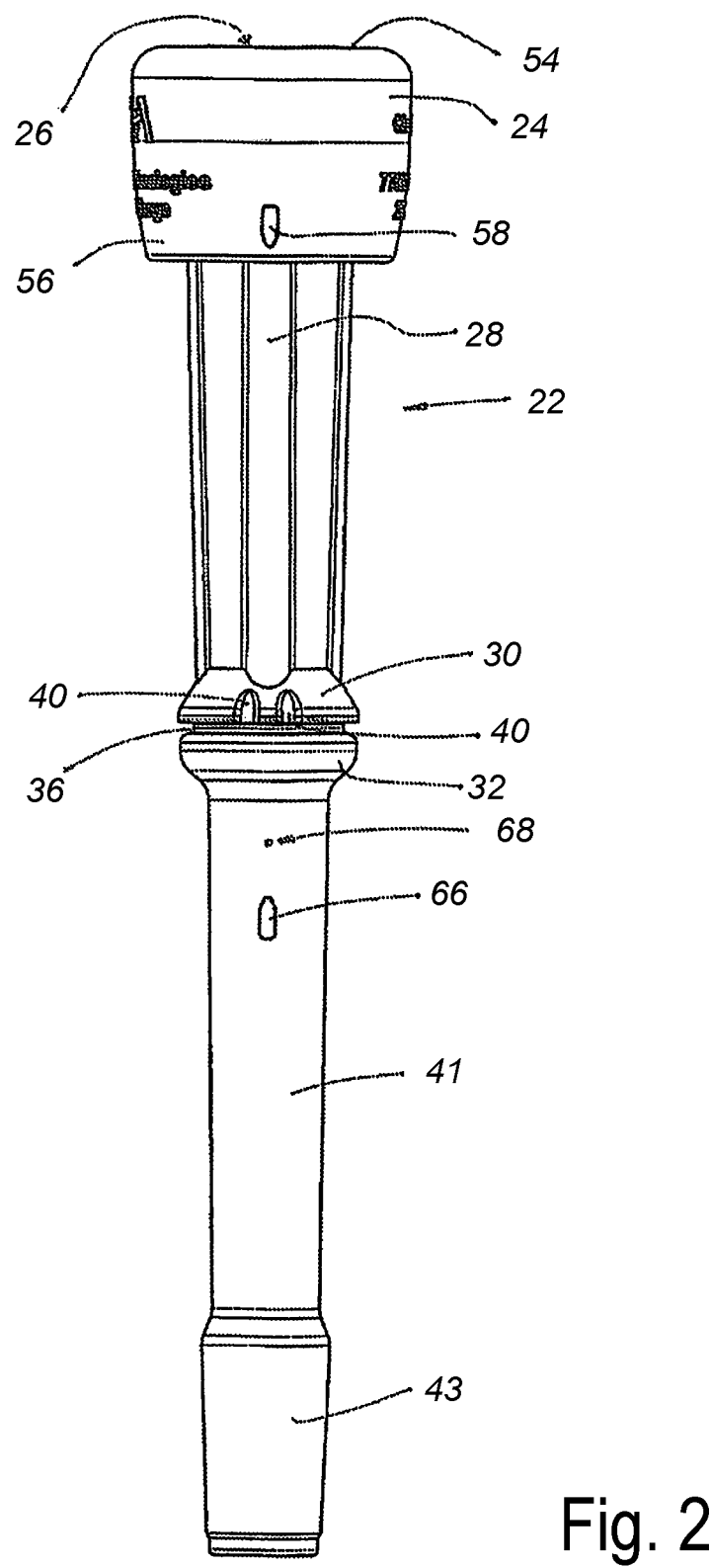
FIG. 2 is a perspective view of a teat cup assembly shell liner in accordance with the present invention.

As depicted in FIGS. 1, 2, 5, and 6, the liner 22 mouthpiece 24 can be of a type and shape described and depicted in U.S. Pat. No. 8,113,145, which is incorporated herein by reference, but other mouthpiece shapes and sizes can be used with the present invention. As depicted in FIGS. 1 and 2, the mouthpiece 24 generally includes and upper surface 54 that interfaces with a teat and udder of a dairy animal to form a comfortable seal that minimizes loss of vacuum from the inside of the liner through the teat opening 26. The mouthpiece 24 further includes a downwardly extending skirt 56 that extends downward and is spaced apart from the barrel 28 so that an upper end of the shell (described below) can fit between the barrel 28 and the mouthpiece skirt 56, when assembled. The mouthpiece skirt 56 can include an alignment mark 58 to aid in assembly.

Figure 5:
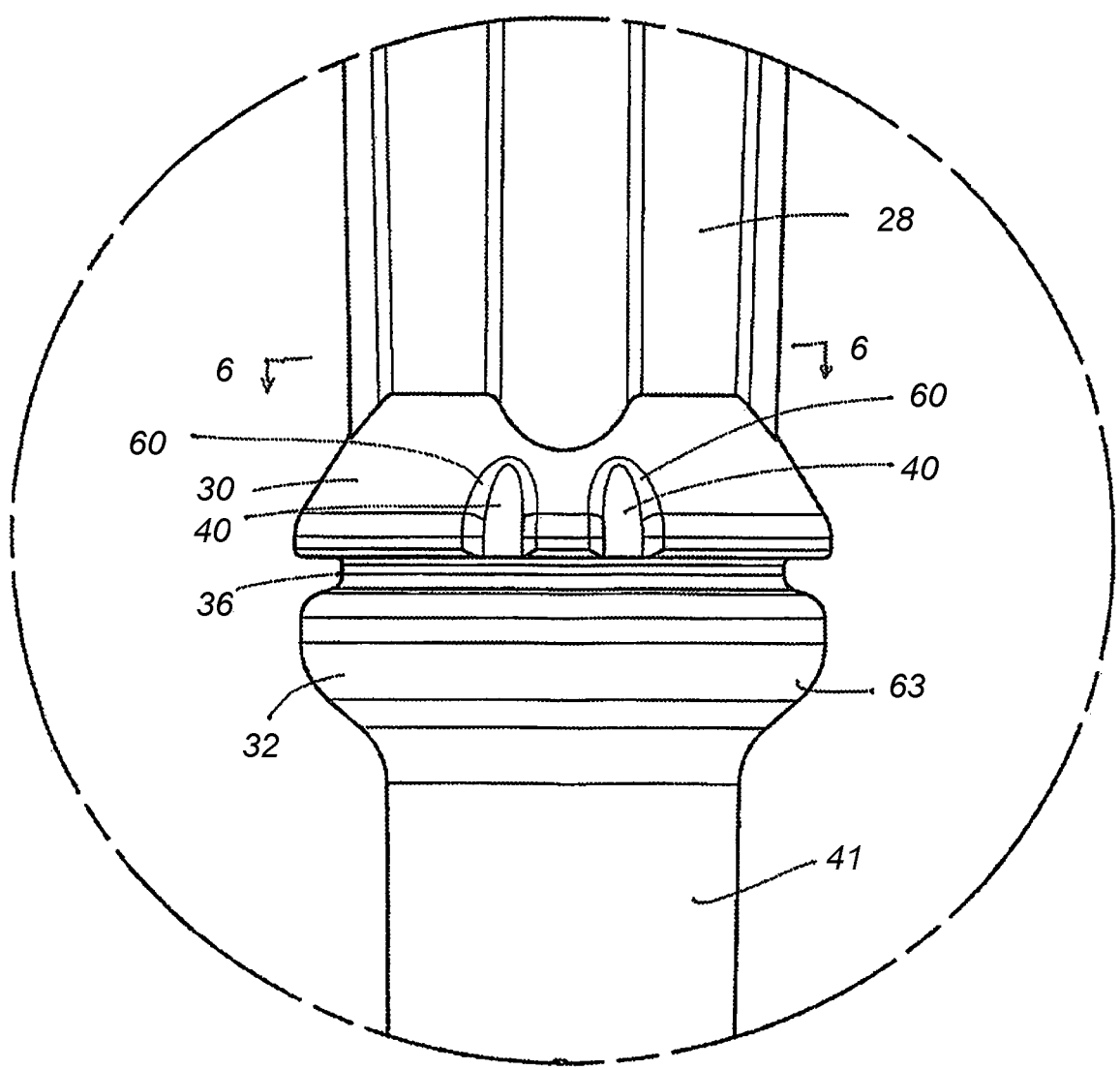
FIG. 5 is a detailed side view of the liner of FIG. 2 and illustrating a pair of alignment recesses in accordance with the present invention.
Figure 6:
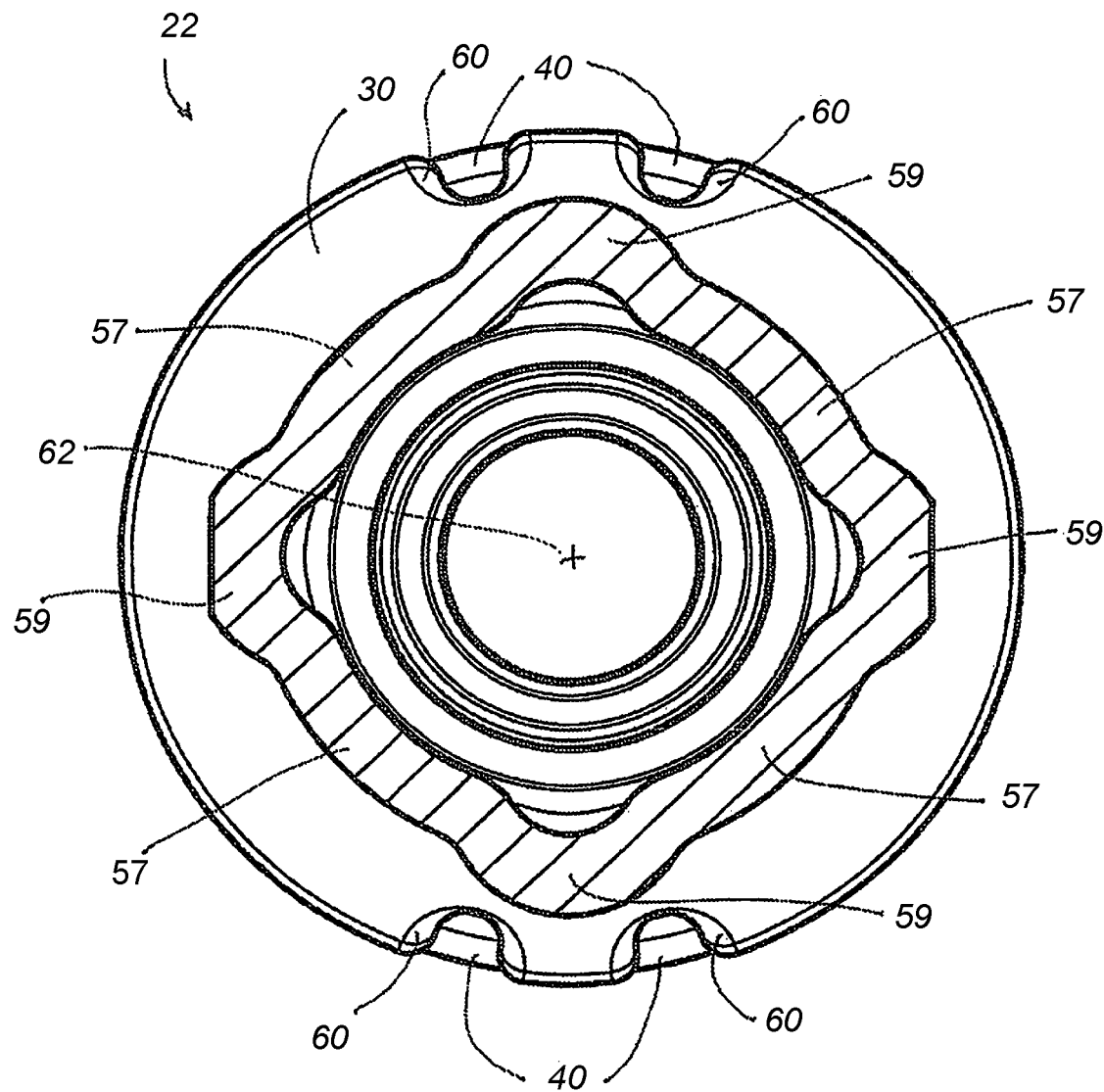
FIG. 6 is a cross-sectional view of the liner taken along line 6-6 in FIG. 5.
Figure 7:
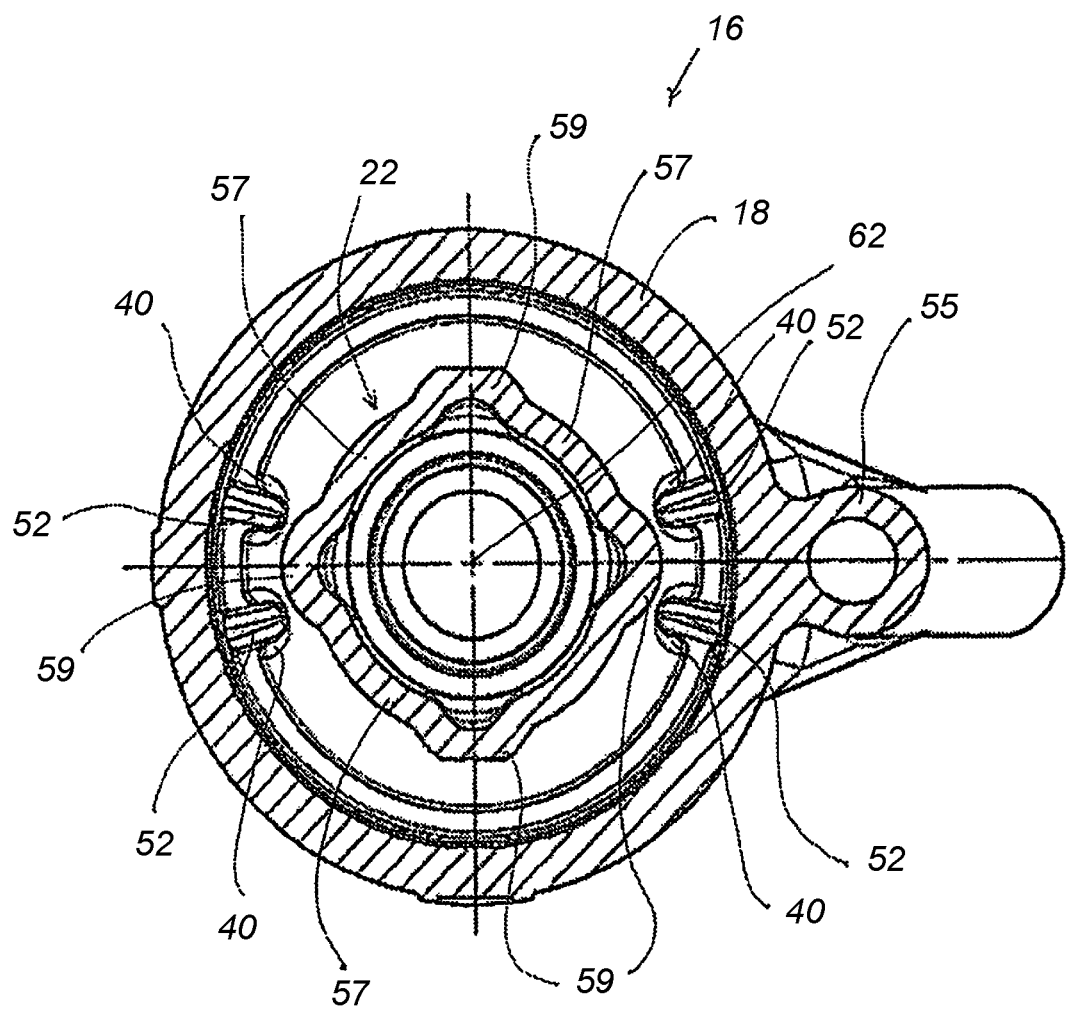
FIG. 7 is a cross-sectional view of the teat cup assembly taken along line 7-7 in FIG. 1.

The barrel 28 defines a longitudinal axis 62 (FIGS. 1, 6, and 7) and the barrel 28, itself, can have any desired cross-sectional shape including, round, oval, triangular, square, and the shape illustrated in FIGS. 1, 2, and 5, for example. Typically, barrel 28 shape is selected to optimize animal comfort and milking efficiency. The barrel 28 illustrated herein has walls 57 and corners 59 (see FIG. 5, for example) that can be of uniform thickness or have varied thicknesses to control collapse of the barrel wall during pulsation and milking or for simplifying manufacturing. Any desired barrel cross-sectional shape can be used with the present invention.

The upper locking ring 30 (sometimes referred to as a "hackle" in the dairy industry) is part of the barrel 28, and is preferably used in the present invention together with the lower locking ring 32 to define the annular recess 36. The liner 22 is joined to the shell lower opening 50 at the inwardly directed annular edge 51 using the annular recess 36. (See FIGS. 1, 2, and 5.) This arrangement provides a secure connection between the liner 22 and shell 18, and due to friction, inhibits some level of twisting of the barrel 28 and the liner 22 relative to the shell 18. Nonetheless, twisting can still occur, so the barrel 28, and particularly the upper locking ring 30 of the liner 22, preferably defines two pairs of alignment recesses 40 to be engaged by the mating keys 52, in the shell 18. Although it is preferred to include the upper locking ring 30, it is not necessary, and the alignment recesses 40 can be formed in any part of the barrel 28, but preferably in the lower end of the barrel 28.

In the illustrated embodiment of FIG. 5, for example, the alignment recesses 40 are formed integrally or are cut or otherwise formed in the upper locking ring 30. As best seen in FIG. 5, the upper locking ring 30 defines the alignment recesses 40 as a generally inverted U-shape with rounded shoulders 60 to enable a smoother assembly of the shell keys 52 into the alignment recesses 40. Also, for forming efficiency and to provide access for the keys 52 to enter the alignment recesses 40, it is preferred that the alignment recesses 40 open to the annular recess 36, as illustrated. To prevent twisting of the liner 22 relative to the shell 18, the alignment recess 40 should be radially spaced apart from a longitudinal axis of the barrel 28.

The drawings illustrate the alignment recesses 40 in two pairs with one pair on a diametrically opposed side from the other. Although the illustrated arrangement is preferred, other arrangements of alignment recesses 40 are possible. For example, a single alignment recess 40 can be used on an asymmetrical arrangement, particularly if a particular orientation of the liner 22 relative to the shell 18 is desired.

Similarly, the shell keys 52 can be provided to match the number of alignment recesses 40, or relatively fewer keys 52 can be provided. For example, two alignment recesses 40 and one key 52 can be used to make it easier to assemble the liner 22 into the shell 18.

The lower locking ring 32 preferably includes a rounded surface 63 against which the inwardly directed annular edge 51 of the lower end of the shell 18 will slide when the liner 22 is being installed in the shell 18. Once the liner 22 is installed, the inwardly directed annular edge 51 is releasably engaged with the liner's annular recess 36. Also, once the liner 22 is installed, it is preferably tensioned somewhat along the longitudinal axis 62, due to the relative size of the shell 18 and the liner 22. This is sometimes referred to as "pretensioning" and it improves liner performance.

The short milk tube 41 can define an alignment feature 66 raised above, which is seen as a vertical embossment on the short milk tube 41 in FIG. 2. An air vent plug mounting hole 68 can also be provided and its location relative to other milker unit components can be controlled using the present invention, if desired. The air vent plug mounting hole 68 extends through a short milk tube barrel wall 69.

FIGS. 8 through 13 illustrate the short milk tube 41 with the air vent plug mounting hole 68 surrounded, at least partially, by an air vent seat 70 in accordance with the present invention. The air vent seat 70 preferably includes an outer seat 74, an inner seat 76, a lip 78 extending outwardly from the short milk tube 41, and a stiffener 81 to control localized bending of the short milk tube 41.

Figure 12:
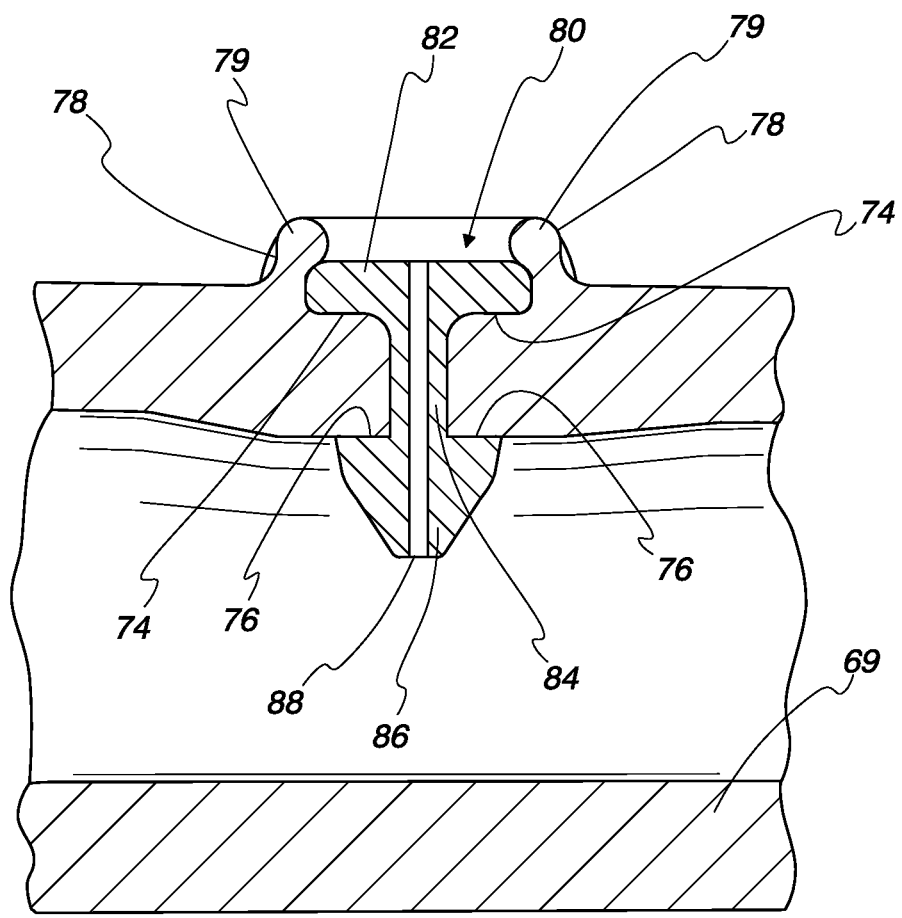
FIG. 12 is a cross-section of the vent plug seat and vent plug, in accordance with the present invention.
Figure 13:
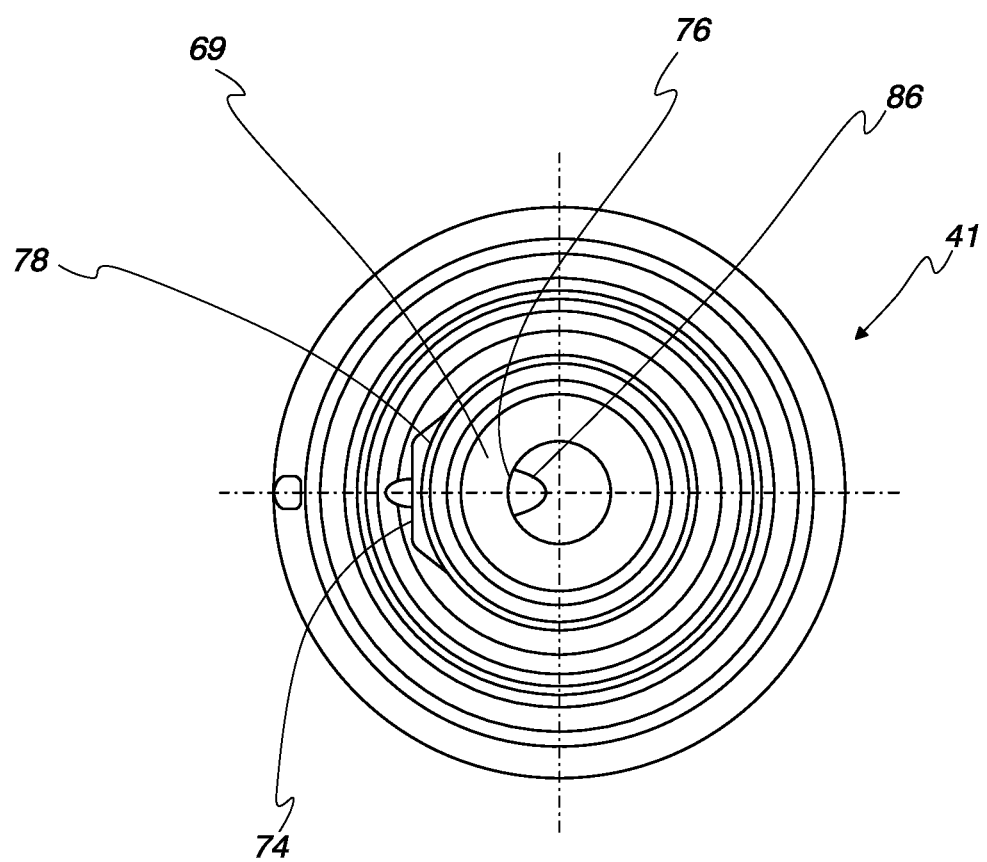
FIG. 13 is an end view of the short milk tube and vent plug seat.
Figure 14:
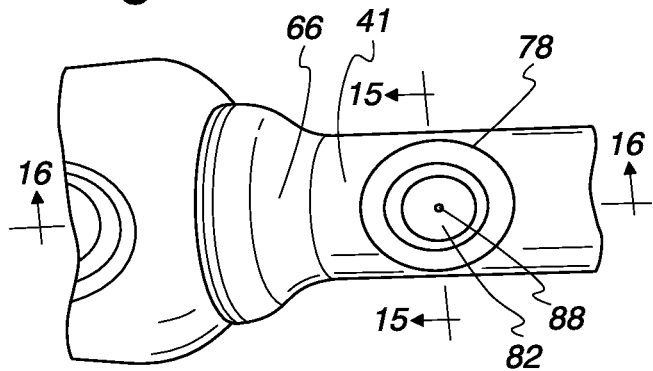
FIG. 14 is a front view of an alternate embodiment of a vent plug seat in accordance with the invention.
Figure 15:
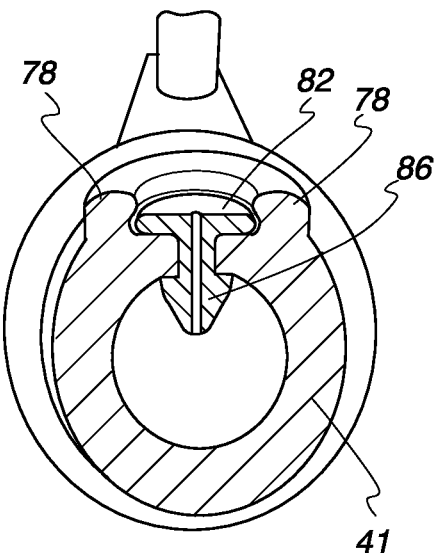
FIG. 15 is a cross-section of the vent plug seat and vent plug, in accordance with the present invention.
Figure 16:
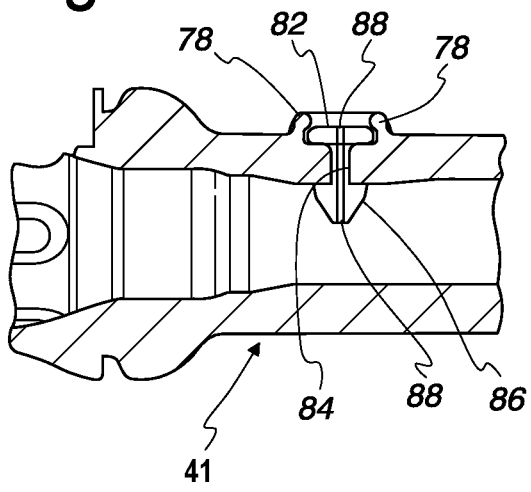
FIG. 16 is a cross-section of the short milk tube and vent plug seat.

As seen in FIG. 12, the air vent plug mounting hole 68 is preferable mated with an air vent plug 80, that includes a head 82, a shaft 84, and a barbed end 86 through which a defined vent orifice 88 is formed. The vent plug 80 is used to ensure that the vent orifice 88 remains open and is of a predetermined size. The vent plug 80 is made of a relatively rigid or robust material, as compared to the more flexible material used for the short milk tube, to ensure that the vent orifice 88 remains open and is a consistent vent opening size. Preferably, the vent plug shaft 84 is sized to substantially match the thickness of the short milk tube wall 69, or is slightly shorter than the wall 69 thickness to ensure a snug fit.

In prior designs, the air vent plug mounting hole 68 was formed by drilling or piercing the short milk tube. If a vent plug were used, it was forced through the drilled or pierced air vent, which could cause the air vent to tear or rip. Also, forces acting on the plug could damage the plug and rip the air vent.

In the present invention, the air vent plug mounting hole 68 is preferably formed simultaneously with the formation of the short milk tube 41, and is preferably formed at an area of increased short milk tube wall 69 thickness. Other methods for forming the vent are also possible.

To ensure a good mating surface between the short milk tube 41 and the vent plug 80, the air vent seat 70 preferably includes the outer seat 74 shaped and sized to mate with the underside of the vent plug head 82. For example, the outer seat 74 can be flat to match the underside of the vent plug head 82, as opposed to an arcuate surface of the short milk tube wall 69 mating with a flat plug surface on the underside of the vent plug head 82, or any other desired part of the vent plug 80.

Also preferably, the air vent seat 70 is provided with the inner seat 76 shaped and sized to mate with the barbed end 86 on the vent plug 80, and to provide a reliable bearing surface on which the barb 84 can bear and provide reliable connection with the vent plug 80. Preferably, the inner seat 76 is also flat to mate with the inner portion of the barbed end 86.

Figure 11:
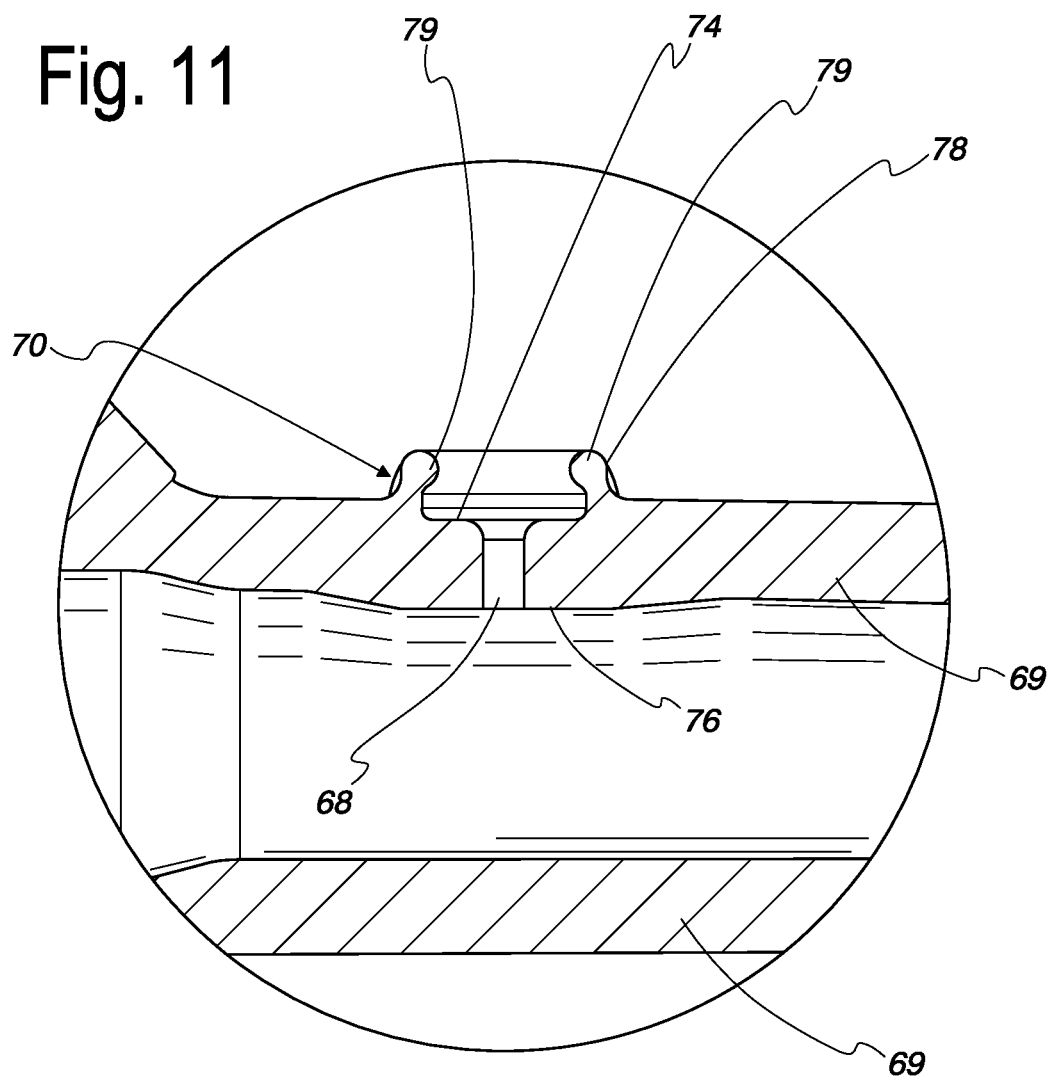
FIG. 11 is an enlarged cross-sectional view of the vent plug seat of FIG. 8.

As stated above, the vent seat 70 also includes a lip 78 that extends outwardly from the short milk tube barrel wall 69. Preferably, the lip 78 is spaced slightly apart from the vent plug mounting hole 68, so that the head 82 of the vent plug 80 is in contact with the lip 78 when the vent plug 80 is inserted in the vent plug mounting hole 68. The lip 78 protects the vent plug 80 from impact forces and helps retain the vent plug 80 if the short milk tube is twisted. Preferably, the lip 78 includes an overlay portion 79 (FIGS. 11 and 12) that enhances protection and retention of the vent plug 80 and limits the amount of dirt and debris that can lodge around the vent plug 80. The cross section of the lip 78 and overlay portion 79 preferably matches the shape of the vent plug 80, as seen in FIGS. 11 and 12, for example, to minimize the chance for dirt and debris to lodge around the vent plug mounting hole 68 and vent plug 80. Other arrangements and spacings are possible as seen in FIGS. 14 through 17, for example.

Figure 8:
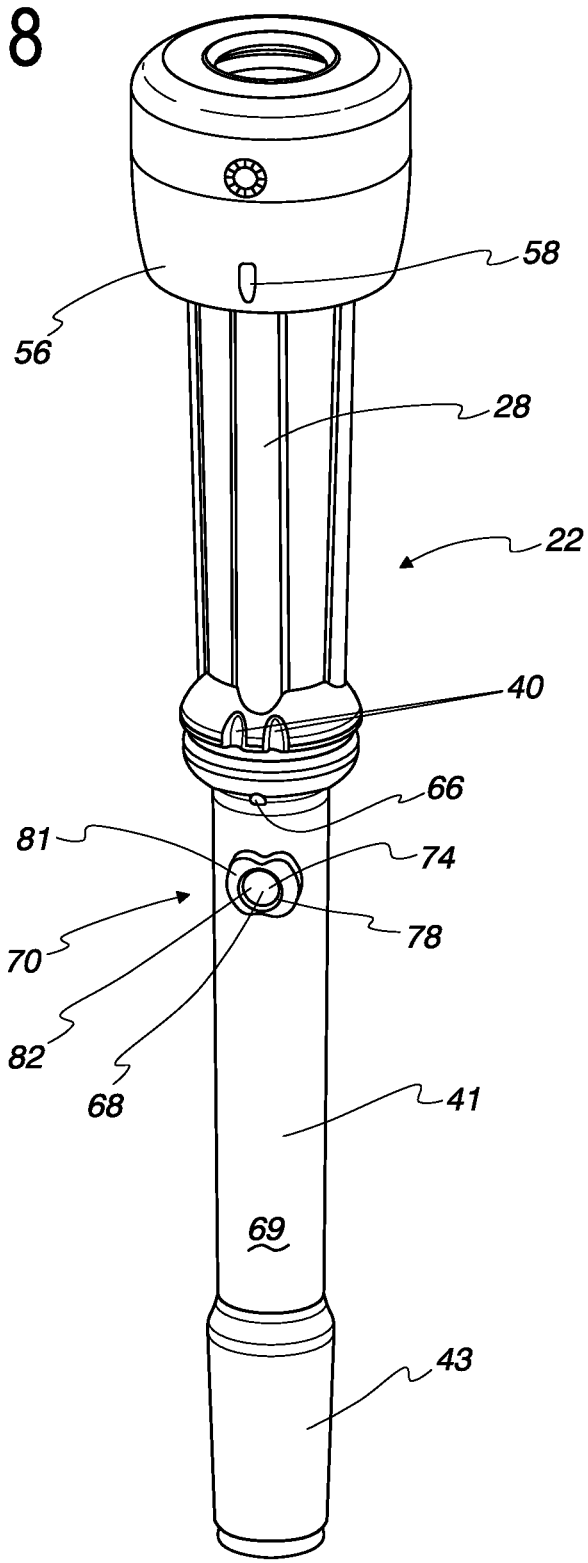
FIG. 8 is a perspective view of a liner with a short milk tube vent plug seat in accordance with the present invention.
Figure 17:
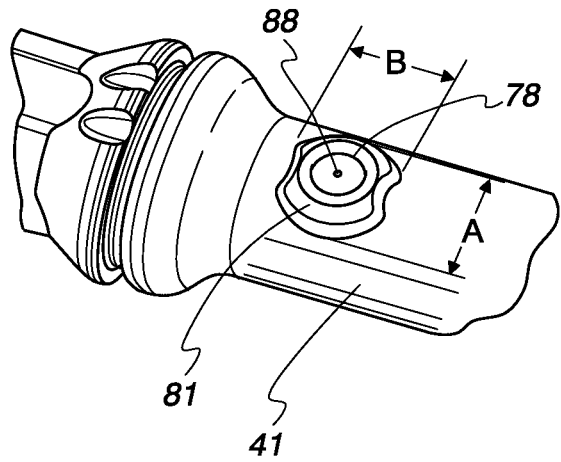
FIG. 17 is a perspective view of an alternate vent seat in accordance with the present invention.

As seen in FIGS. 8, 9, and 17, the illustrated air vent seat 70 includes the stiffener 81 extending away from the air vent seat 70 to at least partially control the degree and direction of localized flexing of the short milk tube wall 69 during installation and use. Preferably, the stiffener 81 extends away from the air vent seat 70 in at least a lateral direction A. The stiffener 81, as illustrated, extends away in a lateral direction a greater amount than in a longitudinal direction B (see FIGS. 9 and 17) to provide some flexibility of the lip 78 in a longitudinal direction while resisting more lateral flexing. Resisting lateral flexing improves protection for the vent seat 70 and vent plug 80. A greater degree of flexing in the longitudinal direction permits greater longitudinal flexing of the short milk tube 41 during use and installation and to allow dirt and debris to drain from inside around the vent plug mounting hole 68.

The stiffener 81 can extend above the surface of the short milk tube 41, either on an internal surface or an external surface, as illustrated. The stiffener 81 can also be flush with the surface of the short milk tube 41 and be made of different (more rigid material used in the short milk tube 41.

Further the stiffener 81 can be uniformly shaped, or it can be "butterfly-shaped" (as illustrated), define gaps, be discontinuous, include multiple segments, extend outwardly to varying degrees, or include any combination of these and other features depending on the degree of desired flexing in both the longitudinal and lateral directions. A contoured shape, the illustrated butterfly shape, for example, reduces areas of stress concentrations that can otherwise occur with stiffeners having more abrupt changes in shape, such as sharp corners. Contoured stiffeners 81 also ease transitions of flexing between the longitudinal and lateral directions, which can extend the useful life of the short milk tube.

The stiffener 81 can be a substantially circular shape or be of any desired shape to compliment the shape of the vent or the vent plug or accommodate forces that are expected to act on the short milk tube and control bending as desired. There may even be multiple parts or rows of lips or there may be lips of different heights to protect the vent plug mounting hole 68 and vent plug 80 from impact from different directions. The stiffener 81 can even aid in resisting twisting of the short milk tube 41 around the longitudinal axis of the short milk tube 41.

The vent seat 70 can be formed integrally with the short milk tube 41 or it can be attached in any suitable manner. The material used for the short milk tube 41 can also be used for the vent seat 70, or the vent seat 70 can be made of a different material.

Although depicted as being positioned close to the vent, the lip 78 can be spaced apart from the vent plug mounting hole 68 to allow an operator to grab the vent plug head 82 for removal, if necessary. The embodiments of FIGS. 14 through 17 are examples of this type of arrangement.

Preferably, the liner is made of silicone, but any other suitable liner material can be used.

The foregoing detailed description of the drawings is provided for a better understanding of the present invention. Nothing therein is intended to unduly limit the scope of the following claims and no unnecessary limitations should be read into the following claims.

The invention claimed is:

1. A short milk tube comprising:
   a short milk tube barrel having a wall defining a bore between an upstream end of the short milk tube barrel and a downstream end of the short milk tube barrel, and defining a vent plug mounting hole into the bore between the upstream end of the short milk tube barrel and the downstream end of the short milk tube barrel;
   a vent plug extending through the vent plug mounting hole and defining a vent orifice to at least partially vent the bore;
   a vent plug seat lip extending outwardly above the wall and at least partially engaged with the vent plug; and
   a stiffener joined to the short milk tube barrel wall in contact with and extending away from the vent plug seat and the stiffener is shaped to define an area of the short milk tube barrel wall that has a greater degree of flexibility in the longitudinal direction than in the lateral direction of the short milk tube barrel wall.

2. The short milk tube of claim 1, wherein the stiffener extends above a surface of the short milk tube barrel wall.

3. The short milk tube of claim 1, wherein the stiffener extends above an outer surface of the short milk tube barrel wall.

4. The short milk tube of claim 1, wherein the stiffener extends away from the vent plug seat in a lateral direction of the short milk tube barrel more than in a longitudinal direction of the short milk tube barrel.

5. The short milk tube of claim 1, wherein the stiffener extends away from the vent plug seat in a lateral direction of the short milk tube barrel with an outer edge that defines a concave contour and in a longitudinal direction of the short milk tube barrel with an outer edge that defines a convex contour.

6. The short milk tube of claim 1, wherein the stiffener is contoured and has a lateral dimension relative to a longitudinal axis of the short milk tube barrel that is greater than a longitudinal dimension relative to a longitudinal axis of the short milk tube barrel.

7. The short milk tube of claim 1, wherein the vent plug seat comprises:
   an inner seat having an inner vent plug mating surface.

8. The short milk tube of claim 1, and further comprising:
   a milker unit teat cup liner joined to the upstream end of the short milk tube barrel.

* * * * *